Jan. 8, 1952     P. GUILLERMET ET AL     2,582,117

APPARATUS FOR CUTTING OUT OPTICAL GLASSES

Filed July 11, 1947

INVENTORS:
PAUL GUILLERMET
FELIX PLANET
BY
Richardson, David and Nordon
ATTORNEYS Patented Jan. 8, 1952

2,582,117

UNITED STATES PATENT OFFICE 2,582,117

APPARATUS FOR CUTTING OUT OPTICAL GLASSES

Paul Guillermet and Felix Planet, Lyon, France

Application July 11, 1947, Serial No. 760,468
In France March 13, 1946

Section 1, Public Law 690, August 8, 1946
Patent expires March 13, 1966

4 Claims. (Cl. 33—23)

This invention relates to an apparatus for cutting out optical glasses.

In the rotating cutters at present employed by opticians for cutting out optical glasses, the diamond by which the cutting is effected, is guided either by eccentrically formed members or by a roller which follows the contour of a pattern having the shape of the spectacle frame or mounting for which the glass is intended.

It is therefore necessary to have available a pattern for each form of spectacles, which is very inconvenient to the optician, especially as the frames of modern spectacles are becoming more and more varied, more and more diverse, and more and more unsymmetrical in form, while the differences in size are constantly increasing.

The main object of the present invention is to avoid the use of such patterns, the actual bezel, frame or equivalent rim means allowing the tracing and cutting of the glass to the exact size of said bezel or at a slightly different, generally slightly larger size.

The invention is based on the principle of the copying device known as a pantograph, and is characterized in that the course followed by the diamond is determined, not by the external contour of a pattern, but by the internal contour of the actual frame or mounting of the spectacles for which the glass to be cut is intended, this mounting being thus utilized as a copying member for cutting its own glasses.

To this end, the frame or mounting of the spectacles to be provided with glasses is disposed on a rotating crown, while a roller follows its internal contour, transmitting the displacements which it undergoes to the diamond through a system of linked levers, so that the said diamond is made to copy exactly the internal contour of the said mounting.

The invention will in any case readily be understood with reference to the accompanying drawing, which is given solely by way of example and which shows a rotating cutter based on this method of operation. In the drawing.

Figure 1:
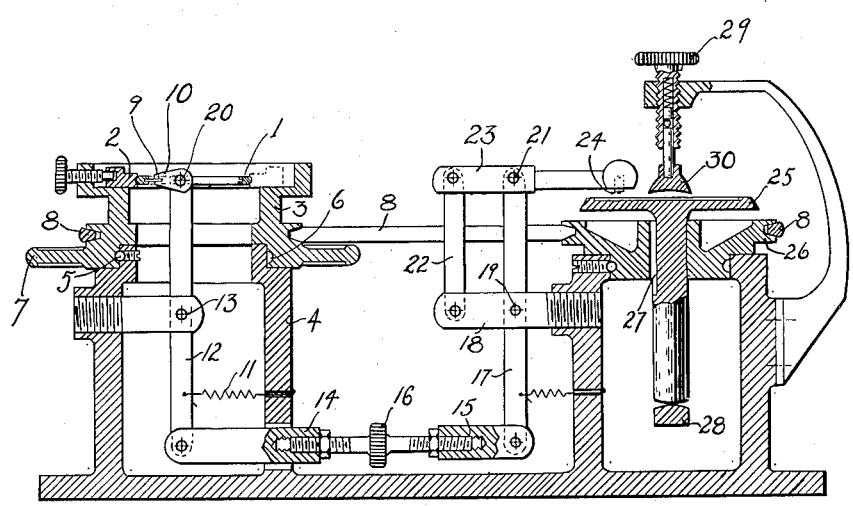
Fig. 1 is a sectional elevation on the line I—I of Fig. 2.

The frame or mounting 1 of the spectacles to be fitted with glass is held fast between adjustable jaws 2 rigidly connected to a rotating crown 3 mounted on a base 4. A ball 5 fitted in a groove 6 opposes any vertical displacement of the said crown. This crown carries in addition a driving wheel 7 and has a trapezoidal groove, in which a belt 8 engages. A narrow steel roller 9 is secured to the top of a movable head 10 and is pressed strongly into the inner groove of the mounting 1 by the action of a spring 11 acting on the lever 12 pivoting about a fixed pin 13 and supporting the said movable head. Through the intermediary of forks 14 and 15 and of a screw member 16 having opposite threads at each end, the lever 12 is connected to a lever 17 pivoting on a fork member 18. The levers 12 and 17 being identical, all the oscillatory movements about the central pin 13 of the lever 12 impart to the lever 17 the same movement about its central pin 19. The displacements of the roller 9, and therefore of the pin 20 of the movable head 10 about the central pin, are therefore integrally transmitted to the pin 21.

Figure 2:
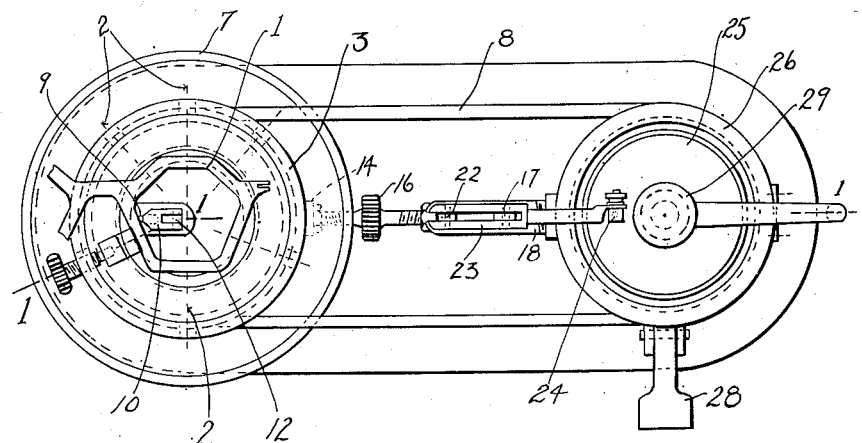
Fig. 2 is a plan view.

A pivoting lever 22 forming a deformable parallelogram in combination with the lever 17 causes the diamond carrier arm 23 to remain horizontal. The diamond 24, which is so mounted on the arm 23 as to be rotatable about its axis for the adjustment as shown in Fig. 2, has imparted to it the same movements as the roller 9. The glass to be cut is mounted on a support 25 which can slide freely in the vertical direction in a crown 26, whilst being rotated by the said crown by means of a key 27. The glass is pressed against the diamond 24 during cutting by means of the lever 28 which presses on the lower end of the support 25.

The glass is maintained in position by a screw 29 and a rubber element 30, which does not prevent rotation.

The trapezoidal belt 8 connects the two rotating crowns 3 and 26. It will be understood that if the crown 3 is turned through the intermediary of its wheel 7, the mounting 1 will be driven by the same movement, so that each of its points will move successively past the roller 9, which will maintain contact under the action of the spring 11. As the crown 3 drives the crown 26, and thus the support 25 and the glass, the diamond 24 will describe over the glass, which is held under pressure against it by the lever 28, oscillations similar to those of the roller 9. The path thus traced will consequently be identical to the internal form of the spectacle frame. The rotation is continued until the cutting is completed, and a glass of the desired shape is thus obtained.

What we claim is:

1. An apparatus for cutting optical glasses chiefly spectacle glasses comprising two rotary carrier members adapted to rotate round two vertical axes, means for securing the frame of the glasses horizontally to one of said members, a roller adapted to engage the inner periphery of the frame, a lever lying in the plane of the two carrier axes and to which said roller is pivotally secured, a horizontal stationary pivot for said lever, means yieldingly acting on the lever for urging the roller thereon into engagement with the frame, means whereby the glass to be cut is carried by the other member in a horizontal position thereon, a cutter adapted to engage operatively the glass on its carrier, a cutter holder, a second lever lying in the plane of the two axes, a horizontal pivot for said second lever, a leverage connecting the two levers in their plane for constraining the roller and cutter to move correspondingly along substantially horizontal lines in the plane of the carrier axes, and means for constraining the two rotary members to rotate in unison.

2. An apparatus for cutting optical glasses chiefly spectacle glasses comprising two rotary carrier members adapted to rotate round two vertical axes, means for securing the frame of the glasses horizontally to one of said members, a roller adapted to engage the inner periphery of the frame, a lever lying in the plane of the two carrier axes and to which said roller is pivotally secured, a horizontal stationary pivot for said lever, means yieldingly acting on the lever for urging the roller thereon into engagement with the frame, means whereby the glass to be cut is carried by the other member in a horizontal position thereon, a cutter adapted to engage operatively the glass on its carrier, a cutter holder, a second lever lying in the plane of the two axes, a horizontal pivot for said second lever, a rod of adjustable length connecting the two levers in their plane for constraining the roller and cutter to move correspondingly along substantially horizontal lines in the plane of the carrier axes, means for adjusting the length of said adjusting rod, means for urging yieldingly the cutter away from the axis of the glass carrying member and means for constraining the two rotary members to rotate in unison.

3. An apparatus for cutting optical glasses chiefly spectacle glasses comprising two rotary carrier members adapted to rotate round two vertical axes, means for securing the frame of the glass horizontally to one of said members, a roller adapted to engage the inner periphery of the frame, a lever lying in the plane of the two carrier axes and to which said roller is pivotally secured, a horizontal stationary pivot for said lever, means yieldingly acting on the lever for urging the roller thereon into engagement with the frame, means whereby the glass to be cut is carried by the other member in a horizontal position thereon, a cutter adapted to engage operatively the glass on its carrier, a substantially horizontal rod holding the cutter, a deformable parallel motion linkage incorporating said rod and lying in the plane of the axes and of which one side extends to form a second lever, a stationary horizontal pivot perpendicular to the plane of the axes and to which said second lever is pivotally connected through an apex of the parallel motion linkage that does not lie on the cutter holding rod, a leverage connecting the two levers in their plane for constraining the roller and cutter to move correspondingly along substantially horizontal lines in the plane of the carrier axes, and means for constraining the two rotary members to rotate in unison.

4. An apparatus for cutting optical glasses chiefly spectacle glasses comprising two rotary carrier members adapted to rotate round two vertical axes, means for securing the frame of the glass horizontally to one of said members, a roller adapted to engage the inner periphery of the frame, a lever lying in the plane of the two carrier axes and to which said roller is pivotally secured, a horizontal stationary pivot for said lever, means yieldingly acting on the lever for urging the roller thereon into engagement with the frame, means whereby the glass to be cut is carried by the other member in a horizontal position thereon, a cutter adapted to engage operatively the glass on its carrier, a substantially horizontal rod holding the cutter, a deformable parallel motion linkage incorporating said rod and lying in the plane of the axes and of which one side extends to form a second lever, a stationary horizontal pivot perpendicular to the plane of the axes and to which said second lever is pivotally connected through an apex of the parallel motion linkage that does not lie on the cutter holding rod, a rod of adjustable length connecting the two levers in their plane for constraining the roller and cutter to move correspondingly along substantially horizontal lines in the plane of the carrier axes, means for adjusting the length of said adjusting rod, means for urging yieldingly the cutter away from the axis of the glass carrying member and means for constraining the two rotary members to rotate in unison.

PAUL GUILLERMET.
FELIX PLANET.

REFERENCES CITED

The following references are of record in the file of this patent:

UNITED STATES PATENTS

| Number | Name | Date |
|---|---|---|
| 1,052,880 | Beck et al. | Feb. 11, 1913 |
| 1,131,379 | Hirschmann | Mar. 9, 1915 |
| 1,202,156 | Bugbee | Oct. 24, 1916 |
| 1,267,836 | Arnold | May 28, 1918 |
| 1,727,283 | Gluck | Sept. 3, 1929 |
| 1,876,785 | Stein | Sept. 13, 1932 |

FOREIGN PATENTS

| Number | Country | Date |
|---|---|---|
| 36,132 | Denmark | June 9, 1926 |
| 924,829 | France | Mar. 17, 1947 |